(12) United States Patent
Madsen et al.

(10) Patent No.: US 11,781,524 B2
(45) Date of Patent: Oct. 10, 2023

(54) ACTIVE YAW MITIGATION OF WIND INDUCED VIBRATIONS

(71) Applicant: Vestas Wind Systems A/S, Aarhus N. (DK)

(72) Inventors: Søren Bøgelund Madsen, Aarhus N (DK); Anders Brohm, Frederiksberg C (DK); Tue Hald, Hadsten (DK); Shougang Qu, Chaoyang (CN)

(73) Assignee: Vestas Wind Systems A/S, Aarhus N (DK)

( * ) Notice: Subject to any disclaimer, the term of this patent is extended or adjusted under 35 U.S.C. 154(b) by 147 days.

(21) Appl. No.: 17/295,919

(22) PCT Filed: Nov. 20, 2019

(86) PCT No.: PCT/DK2019/050359
§ 371 (c)(1),
(2) Date: May 21, 2021

(87) PCT Pub. No.: WO2020/108715
PCT Pub. Date: Jun. 4, 2020

(65) Prior Publication Data
US 2022/0010775 A1    Jan. 13, 2022

(30) Foreign Application Priority Data

Nov. 27, 2018    (CN) .......................... 201811422978.1
Nov. 30, 2018    (DK) ............................ PA 2018 70789

(51) Int. Cl.
*F03D 7/02*         (2006.01)

(52) U.S. Cl.
CPC ......... *F03D 7/0296* (2013.01); *F03D 7/0204* (2013.01); *F05B 2240/912* (2013.01); *F05B 2270/329* (2013.01); *F05B 2270/334* (2013.01)

(58) Field of Classification Search
CPC ...... F03D 7/0296; F03D 13/10; F03D 7/0204; F03D 7/0208; F03D 7/0212
See application file for complete search history.

(56) References Cited

U.S. PATENT DOCUMENTS

| 8,169,098 B2 * | 5/2012 | Scholte-Wassink .... F03D 7/042 290/55 |
| 9,347,431 B2 * | 5/2016 | Esbensen .................. F03D 9/25 |

(Continued)

FOREIGN PATENT DOCUMENTS

| CN | 1205762 A | 1/1999 |
| CN | 103850875 A | 6/2014 |

(Continued)

OTHER PUBLICATIONS

China National Intellectual Property Administration, Office Action in CN Application No. 201811422978.1, dated Nov. 30, 2021.
(Continued)

*Primary Examiner* — Justin D Seabe
(74) *Attorney, Agent, or Firm* — Wood Herron & Evans LLP (57) ABSTRACT

The invention relates to a method and a wind turbine system reducing, preventing or mitigating vibrations due to wind induced vibrations. The wind turbine system includes a wind turbine tower 102, a sensor arrangement 304 for sensing vibrations of the wind turbine tower, a nacelle 104 mounted to the wind turbine tower via a yaw bearing 310 and a control system 306 for controlling yawing of the nacelle relative to the wind turbine tower. The system is adapted for sensing 402 a vibration of the wind turbine tower using the sensor arrangement, providing 404 an input for the control system in response to the vibration of the wind turbine tower as sensed by the sensor arrangement, and providing 406 an output by the control system based on the input, and yawing 408 the wind turbine nacelle based on the output from the (Continued)

control system, and hereby reducing wind induced vibrations of the tower and nacelle, particularly vortex induced vibrations and/or vibrations due to galloping.

19 Claims, 5 Drawing Sheets

(56) References Cited

U.S. PATENT DOCUMENTS

| | | | |
|---|---|---|---|
| 9,677,540 B2 * | 6/2017 | Burra | F03D 7/0204 |
| 11,255,311 B2 * | 2/2022 | Li | F03D 7/042 |
| 11,384,737 B2 * | 7/2022 | Egedal | F03D 7/0204 |
| 2010/0301604 A1 * | 12/2010 | Nielsen | F03D 7/0204 |
| | | | 290/44 |
| 2012/0217748 A1 * | 8/2012 | Gjerlov | F03D 7/0268 |
| | | | 290/44 |
| 2014/0339827 A1 | 11/2014 | Esbensen et al. | |
| 2015/0042094 A1 | 2/2015 | Beekmann | |
| 2015/0076822 A1 * | 3/2015 | Creaby | F03D 7/0276 |
| | | | 290/44 |
| 2015/0211486 A1 * | 7/2015 | de Boer | F03D 7/0204 |
| | | | 290/44 |
| 2017/0335823 A1 | 11/2017 | Gonzalez Castro et al. | |
| 2020/0263666 A1 * | 8/2020 | Pedersen | F03D 7/0224 |

FOREIGN PATENT DOCUMENTS

| | | |
|---|---|---|
| CN | 104165126 A | 11/2014 |
| CN | 104520580 A | 4/2015 |
| CN | 104612899 A | 5/2015 |
| CN | 105201740 A | 12/2015 |
| CN | 107850050 A | 3/2018 |
| DE | 102014212475 A1 | 12/2015 |
| EP | 2738382 A2 | 6/2014 |
| EP | 2803853 A1 | 11/2014 |
| EP | 2851560 A1 | 3/2015 |
| JP | 2007198167 A | 8/2007 |
| WO | 2017137051 A1 | 8/2017 |

OTHER PUBLICATIONS

Danish Patent and Trademark Office, Search and Examination Report in PA 2018 70789, dated Jun. 3, 2019.

European Patent Office, International Search Report and Written Opinion in PCT Application No. PCT/DK2019/050359, dated Jan. 31, 2020.

China National Intellectual Property Administration, First Notification of Office Action in CN Application No. 201811422978.1, dated May 19, 2021.

* cited by examiner

ACTIVE YAW MITIGATION OF WIND INDUCED VIBRATIONS

FIELD OF THE INVENTION

The present invention relates to a method of reducing wind induced vibrations of a wind turbine tower of a wind turbine system, and further relates to a corresponding wind turbine system. Particularly, the method and system is useful for mitigation of vortex induced vibrations and/or vibrations due to galloping.

BACKGROUND OF THE INVENTION

In a tower of a wind turbine, vibrations may be induced due to various wind induced vibrations. One phenomenon is called vortex shedding, which is also referred to as von Karman vibrations. The resulting vibrations are referred to as vortex induced vibrations.

The vortex induced vibrations originate from vortices due to wind flowing around the tower and/or a nacelle mounted on top of the tower. This may in particular occur at specific wind speeds, and may among others vary depending on design of the tower and nacelle. The vibrations may occur in any configuration during the wind turbine lifetime and thus also during the installation stages.

Another type of unwanted vibrations are vibrations arising due to a wind phenomenon called galloping.

There is generally a desire to damp or reduce tower vibrations, and an improved method of reducing wind induced vibrations of a wind turbine tower of a wind turbine system, and a corresponding improved wind turbine system has been found of benefit.

SUMMARY OF THE INVENTION

It may be seen as an object of the present invention to provide a method and a wind turbine system that in particular solves the above mentioned problems due to wind induced vibrations.

The above described object is intended to be obtained in a first aspect of the invention by providing a method of reducing wind induced vibrations of a wind turbine tower of a wind turbine system, wherein the wind turbine system comprises:
- the wind turbine tower,
- a sensor arrangement for sensing vibrations of the wind turbine tower,
- a nacelle mounted to the wind turbine tower via a yaw bearing,
- a control system for controlling yawing of the nacelle relative to the wind turbine tower, and wherein the method comprises:
  - sensing a vibration of the wind turbine tower using the sensor arrangement,
  - providing an input for the control system in response to the vibration of the wind turbine tower as sensed by the sensor arrangement,
  - providing an output by the control system based on the input, and
  - yawing the wind turbine nacelle based on the output from the control system, and hereby reducing wind induced vibrations of the wind turbine tower.

Thus, an improved method of reducing, mitigating or even preventing wind induced vibrations of a wind turbine tower of a wind turbine system is provided. It is an insight disclosed hereby, that yawing the nacelle to a different yaw position can reduce, mitigate or prevent wind induced vibration, even when—or if—no blades, and possibly also no rotor are/is present on the nacelle.

Furthermore, it has been found possible to reduce the wind induced vibration to a very low level or even to prevent them at least for a period of time, by yawing the nacelle to a different yaw position, and also to yaw when vibrations above a vibration threshold have been sensed. Thus, in accordance with the method, change of yaw position may be due to a sensed vibration, and not necessarily due to certain wind direction and/or a certain wind speed. Hereby, a simple, but yet effective method and system can be provided.

Still further, it is also an insight disclosed hereby, that changed aerodynamics of a tower/nacelle system, due to a changed yaw position of the nacelle, have been found to be at least part of what reduces or breaks the wind induced vibrations, in particular vibrations due to vortex induced vibrations and/or vibrations due to galloping. Another part has been found to be a slightly changed weight distribution when yawing the nacelle to a different position, due to a centre of mass of the nacelle not being completely centred in a centre of the tower. In particular, it is an insight disclosed hereby, that when using at least these two parts or factors in combination, wind induced vibrations, in particular vibrations due to vortex induced vibrations and/or vibrations due to galloping, can be reduced in accordance with the present invention.

Thus, the method may comprise that yawing the wind turbine nacelle relative to the wind turbine tower comprises that the nacelle is yawed so that a changed aerodynamic profile of the nacelle and/or that a changed position of a centre of mass of the nacelle relative to a centre of the tower, and due to yawing the nacelle, is used to influence wind induced vibrations, in particular vibrations due to vortex induced vibrations and/or vibrations due to galloping, of the wind turbine tower and its nacelle.

Alternatively or additionally, the method comprises that yawing the wind turbine nacelle relative to the wind turbine tower is coordinated so that a changed aerodynamic profile of the nacelle relative to the wind and/or that a changed position of a centre of mass of the nacelle relative to a centre of the tower, and resulting from a changed yaw position, reduces an oscillatory movement of the wind turbine tower.

In accordance with an embodiment of the invention, the method is applied when the wind turbine system includes a lower number of blades than when the wind turbine system is completely installed. Further, the method may be of particular benefit when the wind turbine system includes zero blades when the method is applied.

It has been found that the blades themselves, at least to some extent and under certain conditions, reduce wind induced vibrations, in particular vibrations due to vortex induced vibrations and/or vibrations due to galloping, of the wind turbine tower. Thus, the method may be seen to be of particular benefit when less than the final number of blades or no blades and/or rotor are mounted at all.

In accordance with an embodiment of the invention, the method is applied when the wind turbine system is not connected to a utility grid, and power for yawing the wind turbine nacelle is supplied by an auxiliary yaw power system. This is seen as an advantage of the present invention, since hereby constant energy from the utility grid is not needed, and hereby the system and method according to the invention can be applied during installation stages of the wind turbine system and thus also during installation of a complete wind turbine park.

In accordance with an embodiment of the invention, vibrations are sensed in multiple directions around the wind turbine tower, and preferably in all directions around the wind turbine tower. Hereby, it is, e.g. not needed to know or estimate in which direction(s) or vertical plane wind induced vibrations are most likely to occur. Still further, then, it is not needed to yaw to a precise different yaw position where vibrations can also be sensed.

Wind induced vibrations, in particular vibrations due to vortex induced vibrations and/or vibrations due to galloping, will occur in a direction approximately 90 degrees to a direction of the wind.

In accordance with an embodiment of the invention, the method according to any of the preceding claims, wherein yawing the wind turbine nacelle based on the output from the control system is provided when the sensed vibration is above a threshold.

In accordance with an embodiment of the invention, an orientation of the nacelle is sensed using a nacelle orientation sensor, capable of sensing a yaw angle orientation of the nacelle and a difference between the orientation of the nacelle.

The nacelle orientation sensor may be used to avoid over twisting any power and/or control cables in the tower, in particular if such are present when the method is applied. Additionally or alternatively a direction of a sensed vibration can be used as input to the control system. Hereby yawing towards a certain position of the nacelle relative to the wind induced vibration can be provided. Such position may e.g. be a position in which there is between about 25 and about 65 degrees difference between the vibrations and a direction or position of the nacelle. Particularly it has been found that when seeking a difference between the yaw position of the nacelle and the vibration direction of about 45 degrees a particular advantageous method is provided.

Alternatively, or additionally, and possibly at least under some conditions it may be found of benefit that if the nacelle is between 0 and 45 degrees relative angle to a direction of the vibration, the yaw system shall keep yawing in increments of at least e.g. 5 or 10 degrees in a clockwise/CW direction, until the vibration stops or the relative angle is 90 degrees.

Alternatively, or additionally, and possibly at least under some conditions it may be found of benefit that if the nacelle is between 45 and 90 degrees relative angle to a direction of the vibration, the yaw system shall keep yawing in increments of at least e.g. 5 or 10 degrees in a counter clockwise/CCW direction, until the vibration stops or the relative angle is 0 degrees.

Alternatively or additionally, the method may comprise that a yawing angle of yawing the nacelle relative to the wind turbine tower is at least 5 degrees, such as at least 10, 15, 20, 25, 30, 35, 40 or 45 degrees, and preferably an angle in the interval from 5 to 175 degrees, more preferred in the interval from 5 to 85 degrees, most preferred in an interval from 5 to 30 degrees.

In accordance with an embodiment of the invention, the method comprises that a yawing angle of yawing the nacelle relative to the wind turbine tower is at least 5 degrees. Such difference in yaw position has been found e.g. to change the aerodynamic profile of the nacelle relative to the wind and/or the off-centred, relative to the centre of the tower, centre of mass of the nacelle enough to reduce the vibrations significantly, while not using as much power as e.g. a continued change and/or a change of angle such as 30, 60, 90 or 120 degrees would cause.

In accordance with an embodiment of the invention, the method comprises that after the nacelle has yawed a given angle from a first yaw position to a second yaw position, the vibrations are sensed, and a decision of if to yaw further is provided in response to the sensed vibrations at the second yaw position.

In accordance with an embodiment of the invention, yawing of the nacelle is stopped at the second position, a first time period is lapsed at the second yaw position prior to deciding if to stop for a second time period at the second yaw position.

In accordance with an embodiment of the invention, the nacelle is yawed a certain yawing angle in dependence of an amplitude of the vibrations of the wind turbine tower relative to a threshold, or in dependence of a change of amplitude of the vibrations of the wind turbine tower relative to an amplitude at a previous or former position of the nacelle. The threshold can be set for a $1^{st}$ mode vibration of the vibration signal. The threshold may alternatively or additionally be set, so as to trigger a changed yaw position, when an RMS value of the vibration signal has a peak above a limit, e.g. for a certain duration. Analysis of the vibration signal may include Fast Fourier Transformation (FFT) methods, density methods or similar.

It has been found that one or more of the following criteria's can be used to determine if a vibration is a wind induced vibration or not, and in particular if the vibration is a vortex induced vibration and/or a vibration due to galloping.

Vortex induced vibrations of the tower and/or vibrations due to galloping will typically have a resonance with the tower below 2 Hz.

A threshold criteria could alternatively or additionally be that the amplitude of the vibration is at least 0.03 m or at least 0.04 m/s2—in particular for a $1^{st}$ order vibration at a frequency in an interval of e.g. [0.1-0.4] Hz.

A threshold criteria could alternatively or additionally be that the amplitude of the vibration is at least 0.4 m or at least 0.5 m/s2—in particular for a $2^{nd}$ order vibration at a frequency in an interval of e.g. [0.7-1.5] Hz.

An example of an amplitude of a 1st order natural frequency of an unwanted vibration caused by vortex induced vibrations and/or due to galloping could be present at about 0.2 Hz and having an amplitude of about 0.03 m or slightly higher.

An example of an amplitude of a 2nd order natural frequency of an unwanted vibration caused by vortex induced vibrations and/or due to galloping could be present at about 1 Hz and having an amplitude e.g. in the interval 0.5 m.-1.2 m. These examples could be from a wind turbine system with a tower of about 120 m. height.

In accordance with an embodiment of the invention, a settling period of any wind turbine tower vibrations is lapsed at a yaw position and prior to deciding if to stop for a prolonged period at the changed yaw position.

In accordance with an embodiment of the invention, the wind induced vibrations are vortex induced vibrations and/or vibrations due to galloping.

The method may be applied during an installation period of the wind turbine, such as when the turbine only has less than the final number of blades or no blades as elsewhere elaborated herein, or during a service period of the wind turbine.

According to a second aspect of the invention there is provided a wind turbine system comprising
a wind turbine tower, a sensor arrangement for sensing vibrations of the wind turbine tower, a nacelle mounted to the wind turbine tower via a yaw bearing, a control system for controlling yawing of the nacelle, and wherein the wind turbine system is adapted to:

sense a vibration of the wind turbine tower using the sensor arrangement, provide an input for the control system in response to the vibration of the wind turbine tower as sensed by the sensor arrangement, provide an output by the control system based on the input, and yaw the wind turbine nacelle based on the output from the control system, and hereby reduce wind induced vibrations of the wind turbine tower.

The improvements, insights and advantages of such a system have already been elaborated for the method aspect.

According to a third aspect of the invention, a computer program is provided, for controlling the operation of a wind turbine, the computer program, when being executed by a data processor, is adapted for controlling and/or for carrying out the method as described herein.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

Embodiments of the present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
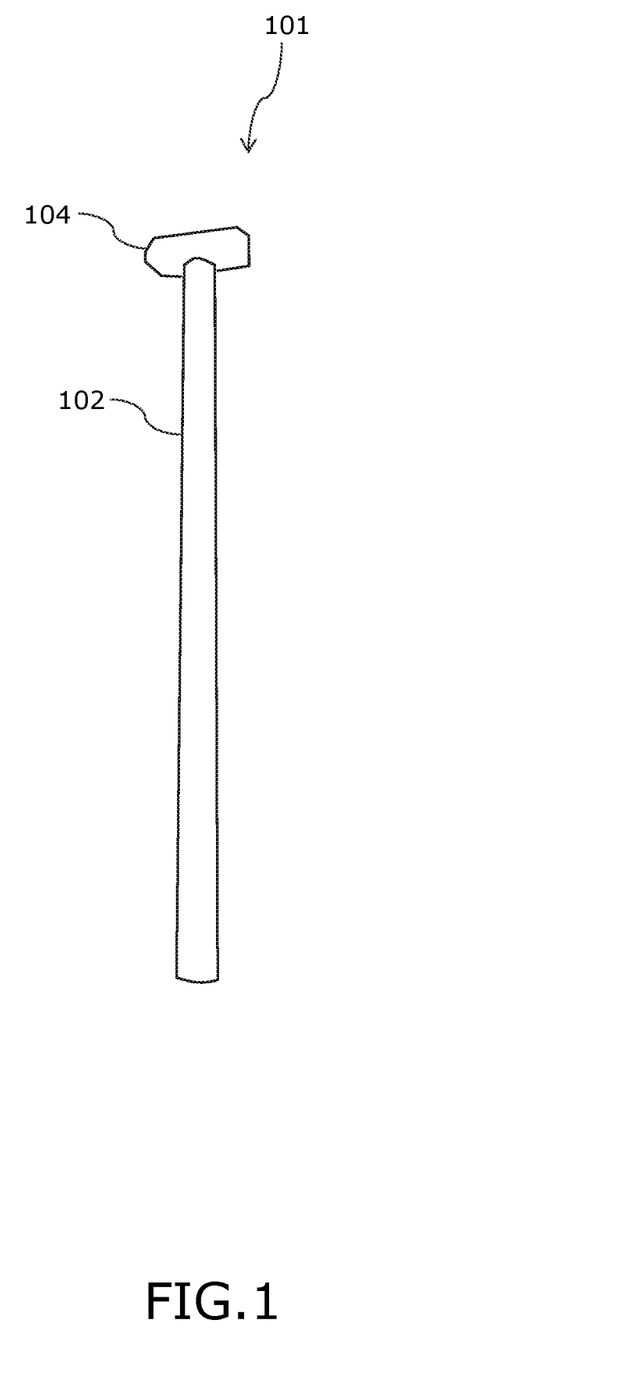
FIG. 1 depicts a wind turbine tower mounted with a nacelle.
Figure 3:
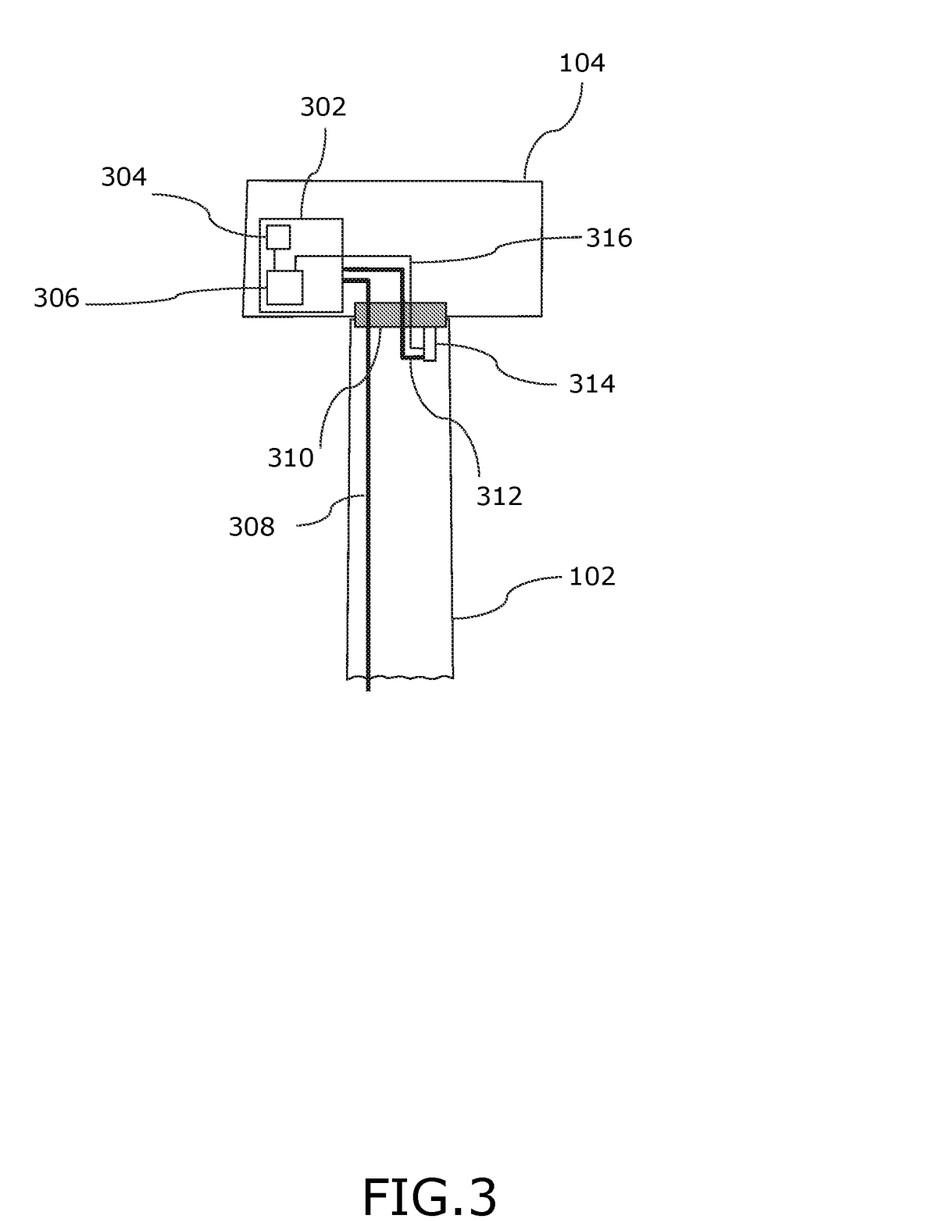
FIG. 3 depicts a wind turbine system according to the present invention.

FIG. 1 depicts a wind turbine tower 102 mounted with a nacelle 104. The tower and nacelle can be installed at sea or inland. The nacelle is rotatable around the tower 102 via a yaw bearing. The yaw bearing cannot be seen in FIG. 1, but is illustrated in FIG. 3.

It follows from the figure that the wind turbine system 101 includes a lower number of blades than when the wind turbine system is completely installed. In the particular example shown here, the wind turbine system includes zero blades.

Figure 2:
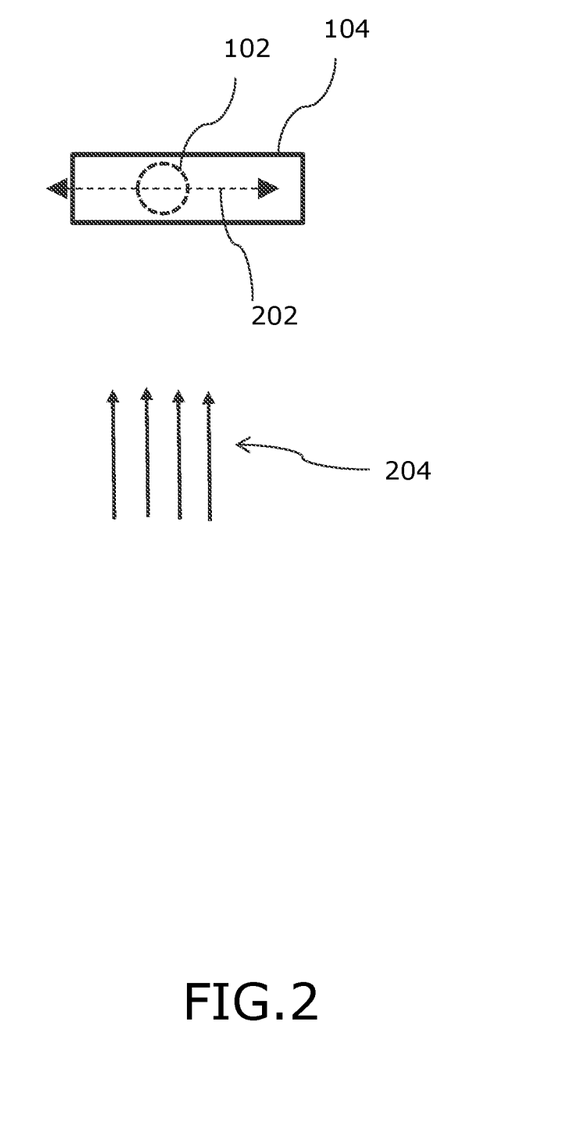
FIG. 2 illustrates wind induced vibrations of the wind turbine tower in a top view.

FIG. 2 illustrates wind induced vibrations 202 in direction of the double arrow with the reference number 202, of the wind turbine tower 102.

The tower 102 and nacelle 104 are seen from a top view, and a wind direction 204 is also illustrated. It follows that the wind induced vibrations 202 are dominantly in a direction transverse to the wind direction 204, i.e. dominantly cross-wind-vibrations.

FIG. 3 depicts elements of a wind turbine system according to the present invention. As illustrated the wind turbine system includes a wind turbine tower 102, a sensor arrangement 304 for sensing vibrations of the wind turbine tower 102, a nacelle 104 mounted to the wind turbine tower via a yaw bearing 310, and a control system 306 for controlling yawing of the nacelle. The wind turbine system is adapted to sense a vibration of the wind turbine tower using the sensor arrangement 304, and providing an input for the control system in response to the vibration of the wind turbine tower as sensed by the sensor arrangement, and to provide an output by the control system based on the input. In addition the yaw drive 314 is adapted to yaw the wind turbine nacelle based on the output from the control system, and hereby reduce wind induced vibrations of the wind turbine tower 102.

In the drawing, it is illustrated that the control system 306 and the vibration sensor are included in one unit 302 or one yawing tool, which are hardwired to each other. However, they may alternatively be provided as separate units, and may use wired or wireless operable connections. Likewise, a communication cable 316 is illustrated between the control system 306 and a yaw drive 314, however such communication may alternatively be a wireless connection.

The thick black line 308 illustrates a power line for powering the control system 306, the sensor arrangement 304 and the yaw drive 314. Only one yaw drive is shown for simplicity, however multiple drives, such as 2, 3, 4, 5, 6, 8 or more drives may be used to yaw the nacelle 104. The thick black line 312 illustrates a power line for the yaw drive 314. The power for the yaw drive may be switched on and off in the unit 302 and thus the power line 312 is needed. Alternatively, switching the yaw drive on or off is carried out at the yaw drive, using only signals in the communication cable and power directly from the power line 308.

In the described embodiment, an auxiliary yaw power system is used (not shown), which auxiliary yaw power system includes a battery. In the figure it is illustrated that the power line 308 is for a battery (not shown) to be positioned in or close to the bottom end of the tower 102. However, such battery may additionally or alternatively be positioned in or in vicinity of the top end of the tower and/or in vicinity or in the nacelle. Using a battery is of particular help when the wind turbine system is yet off grid. However, when coupled to the grid, the system and method as described herein is used e.g. during servicing of the wind turbine, power is present without using one or more batteries.

Figure 4:
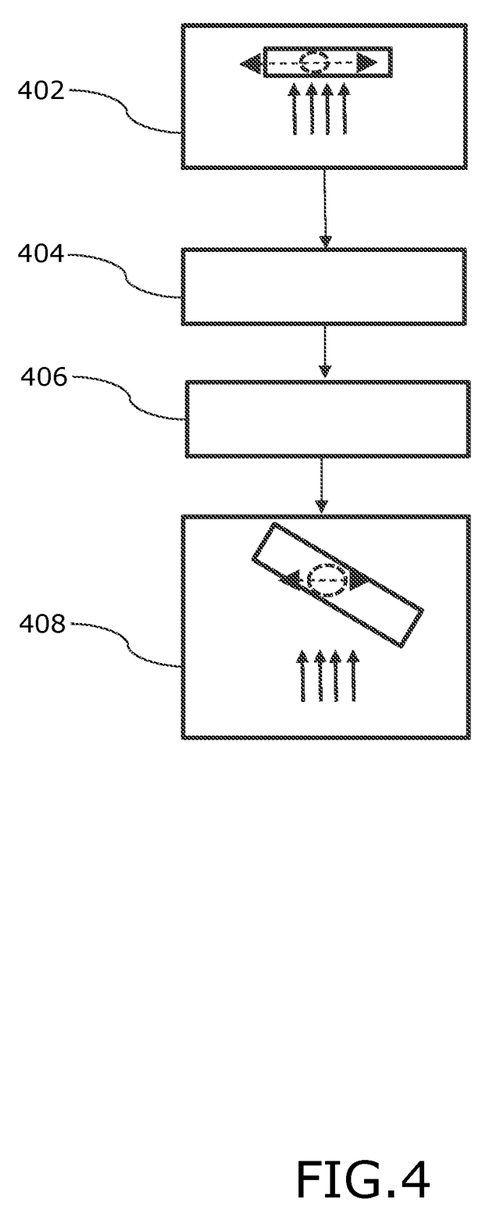
FIG. 4 illustrates a method according to the invention.

FIG. 4 illustrates a method according to the invention. Thus, there is illustrated a method of reducing wind induced vibrations of a wind turbine tower of a wind turbine system, including sensing 402 a vibration of a wind turbine tower using the sensor arrangement, providing 404 an input for a control system in response to the vibration of the wind turbine tower as sensed by the sensor arrangement, providing 406 an output by the control system based on the input, and yawing 408 the wind turbine nacelle based on the output from the control system, and hereby reducing wind induced vibrations of the wind turbine tower.

Figure 5:
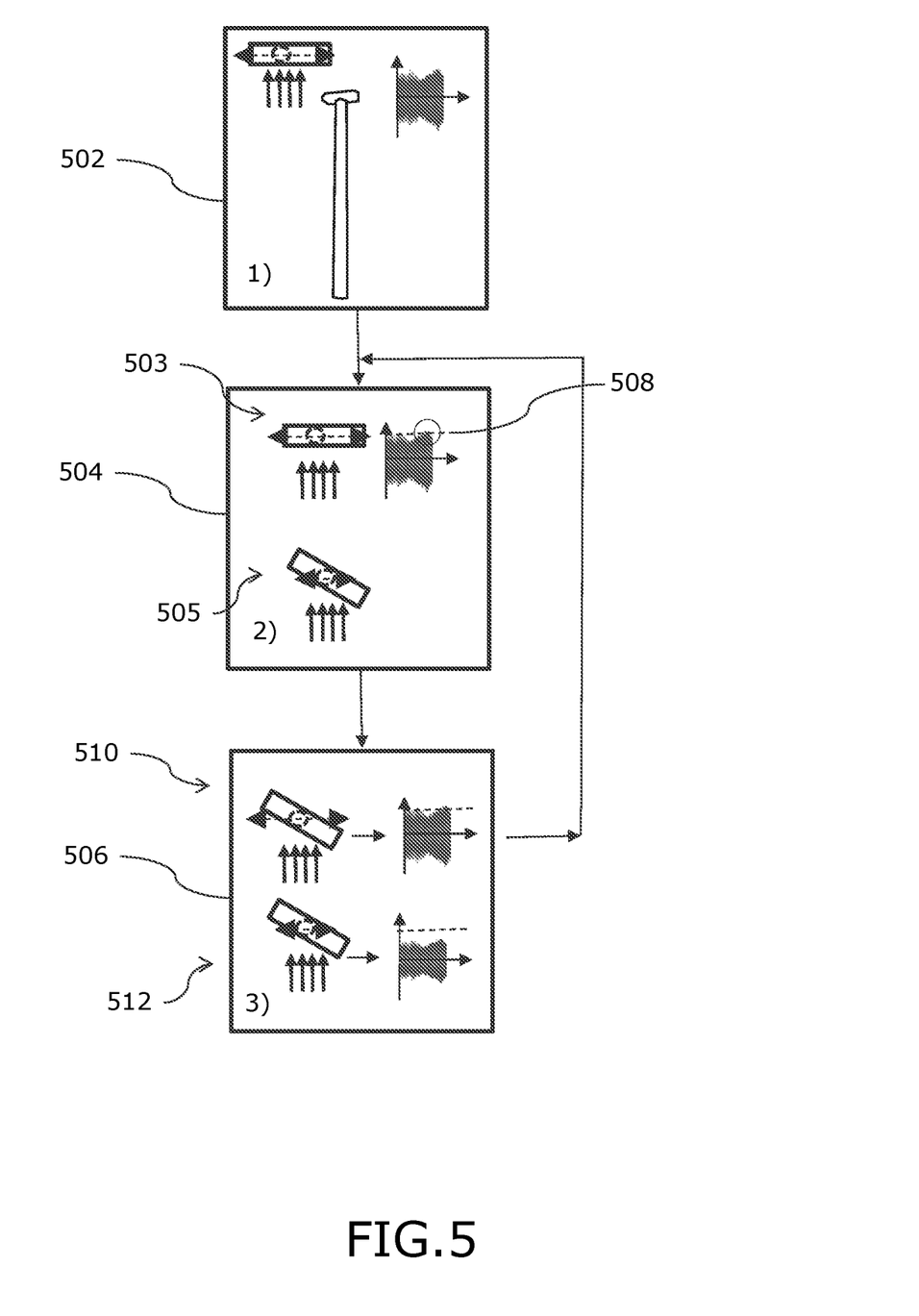
FIG. 5 is a flow diagram elaborating an embodiment of the present invention.

FIG. 5 is a flow diagram illustrating and elaborating an embodiment of the method according to the present invention.

In a step 1) of this embodiment, vibrations in the upper end-most part of the tower and/or in the nacelle are monitored.

In response to vibrations above a threshold level 508, there is in step 2) given a signal to yaw the nacelle a given amount, e.g. an angle, from a first position 503 to a second position 505.

A given period expires with the nacelle stopped in the second position in a step 3). The given period can as an example be chosen so as to enable any vibrations of the tower and nacelle in the second position to settle at a changed vibration level.

If the changed vibration level is still above a threshold, as illustrated at reference 510, which may be the same or slightly different from the threshold level mentioned in step 1), the actions as described in step 2) are applied, but now from the second position and to a third position.

If the changed vibration level is below a threshold, which may be the same or slightly different from the threshold level mentioned in step 1), the nacelle remains positioned in the second position as illustrated at reference 512, and the vibrations are monitored in the second position as submitted in step 1).

In short there is herein disclosed a method and a wind turbine system reducing, preventing or mitigating vibrations due to wind induced vibrations. The wind turbine system includes a wind turbine tower 102, a sensor arrangement 304 for sensing vibrations of the wind turbine tower, a nacelle 104 mounted to the wind turbine tower via a yaw bearing 310 and a control system 306 for controlling yawing of the nacelle relative to the wind turbine tower. The system is adapted for sensing 402 a vibration of the wind turbine tower using the sensor arrangement, providing 404 an input for the control system in response to the vibration of the wind turbine tower as sensed by the sensor arrangement, and providing 406 an output by the control system based on the input, and yawing 408 the wind turbine nacelle based on the output from the control system, and hereby reducing wind induced vibrations of the tower and nacelle, particularly vortex induced vibrations and/or vibrations due to galloping.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of reducing wind induced vibrations of a wind turbine tower of a wind turbine system, wherein the wind turbine system comprises:
   the wind turbine tower,
   a sensor arrangement for sensing vibrations of the wind turbine tower,
   a nacelle mounted to the wind turbine tower via a yaw bearing,
   a nacelle orientation sensor,
   a control system for controlling yawing of the nacelle relative to the wind turbine tower, and wherein the method comprises:
   sensing a vibration of the wind turbine tower and a direction of the vibration using the sensor arrangement,
   sensing a yaw angle orientation of the nacelle,
   determining a difference between the yaw angle orientation and the direction of the sensed vibration,
   providing an input including the difference between the yaw angle orientation of the nacelle and the direction of the sensed vibration for the control system in response to the vibration of the wind turbine tower as sensed by the sensor arrangement,
   providing an output by the control system based on the input, and
   yawing the wind turbine nacelle based on the output from the control system, and hereby reducing wind induced vibrations of the wind turbine tower,
   wherein yawing the wind turbine nacelle based on the output from the control system includes yawing the wind turbine nacelle so that the difference between the yaw angle orientation of the nacelle and the direction of the vibration is between 25 and 65 degrees.

2. The method according to claim 1, wherein, when the method is applied, the wind turbine system includes a lower number of blades than when the wind turbine system is completely installed.

3. The method according to claim 2, wherein the wind turbine system includes zero blades when the method is applied.

4. The method according to claim 1, wherein the wind turbine system is not connected to a utility grid and power for yawing the wind turbine nacelle is supplied by an auxiliary yaw power system.

5. The method according to claim 1, wherein the method comprises that vibrations are sensed in multiple directions around the wind turbine tower.

6. The method according to claim 1, wherein yawing the wind turbine nacelle based on the output from the control system is provided when the sensed vibration is above a threshold.

7. The method according to claim 1, wherein the method comprises that a yawing angle of yawing the nacelle relative to the wind turbine tower is at least 5 degrees.

8. The method according to claim 1, wherein the method comprises that after the nacelle has yawed a given angle from a first yaw position to a second yaw position, the vibrations are sensed, and a decision of if to yaw further is provided in response to the sensed vibrations at the second yaw position.

9. The method according to claim 8, wherein the method comprises that yawing of the nacelle is stopped at the second position, a first time period is lapsed at the second yaw position prior to deciding if to stop for a second time period at the second yaw position.

10. The method according to claim 1, wherein the method comprises that the nacelle is yawed a certain yawing angle in dependence of an amplitude of the vibrations of the wind turbine tower relative to a threshold, or in dependence of a change of amplitude of the vibrations of the wind turbine tower relative to an amplitude at a previous or former position of the nacelle.

11. The method according to claim 1, wherein the method comprises that a settling period of any wind turbine tower vibrations is lapsed at a yaw position and prior to deciding if to stop for a prolonged period at a changed yaw position.

12. The method according to claim 1, wherein the wind induced vibrations are vortex induced vibrations and/or vibrations due to galloping.

13. The method of claim 1, wherein yawing the wind turbine nacelle based on the output from the control system includes yawing the wind turbine nacelle so that the difference between the yaw angle orientation of the nacelle and the direction of the vibration is 45 degrees.

14. A controller including a computer program for controlling the operation of a wind turbine, wherein the computer program, when executed by a data processor of the controller, is adapted to cause the controller to carry out the method as set forth in claim 1.

15. A wind turbine system comprising:
a wind turbine tower,
a sensor arrangement for sensing vibrations of the wind turbine tower,
a nacelle mounted to the wind turbine tower via a yaw bearing,
a nacelle orientation sensor,
a control system for controlling yawing of the nacelle, and wherein the wind turbine system is adapted to:
sense a vibration of the wind turbine tower and a direction of the vibration using the sensor arrangement,
sense a yaw angle orientation of the nacelle,
determine a difference between the yaw angle orientation and the direction of the vibration,
provide an input including the difference between the yaw angle orientation of the nacelle and the direction of the vibration for the control system in response to the vibration of the wind turbine tower as sensed by the sensor arrangement,
provide an output by the control system based on the input, and
yaw the wind turbine nacelle based on the output from the control system, and hereby reduce wind induced vibrations of the wind turbine tower,
wherein yawing the wind turbine nacelle based on the output from the control system includes at least one of:
  yawing the wind turbine nacelle so that the difference between the yaw angle orientation of the nacelle and the direction of the vibration is between 25 and 65 degrees,
  if the difference between the yaw angle orientation of the nacelle and the direction of the vibration is between 0 and 45 degrees, yawing the wind turbine nacelle in increments of between 5 and 10 degrees in a direction that increases the difference between the yaw angle orientation of the nacelle and the direction of the vibration until the vibration stops or the difference between the yaw angle orientation of the nacelle and the direction of the vibration is 90 degrees, and
  if the difference between the yaw angle orientation of the nacelle and the direction of the vibration is between 45 and 90 degrees, yawing the wind turbine nacelle in increments of between 5 and 10 degrees in a direction that decreases the difference between the yaw angle orientation of the nacelle and the direction of the vibration until the vibration stops or the difference between the yaw angle orientation of the nacelle and the direction of the vibration is 0 degrees.

16. A method of reducing wind induced vibrations of a wind turbine tower of a wind turbine system, wherein the wind turbine system comprises:
the wind turbine tower,
a sensor arrangement for sensing vibrations of the wind turbine tower,
a nacelle mounted to the wind turbine tower via a yaw bearing,
a nacelle orientation sensor,
a control system for controlling yawing of the nacelle relative to the wind turbine tower, and wherein the method comprises:
sensing a vibration of the wind turbine tower and a direction of the vibration using the sensor arrangement,
sensing a yaw angle orientation of the nacelle,
determining a difference between the yaw angle orientation and the direction of the sensed vibration,
providing an input including the difference between the yaw angle orientation of the nacelle and the direction of the sensed vibration for the control system in response to the vibration of the wind turbine tower as sensed by the sensor arrangement,
providing an output by the control system based on the input, and
yawing the wind turbine nacelle based on the output from the control system, and hereby reducing wind induced vibrations of the wind turbine tower,
wherein yawing the wind turbine nacelle based on the output from the control system includes,
if the difference between the yaw angle orientation of the nacelle and the direction of the vibration is between 0 and 45 degrees, yawing the wind turbine nacelle in increments of between 5 and 10 degrees in a direction that increases the difference between the yaw angle orientation of the nacelle and the direction of the vibration until the vibration stops or the difference between the yaw angle orientation of the nacelle and the direction of the vibration is 90 degrees.

17. A controller including a computer program for controlling the operation of a wind turbine, wherein the computer program, when executed by a data processor of the controller, is adapted to cause the controller to carry out the method as set forth in claim 16.

18. A method reducing wind induced vibrations of a wind turbine tower of a wind turbine system, wherein the wind turbine system comprises:
the wind turbine tower,
a sensor arrangement for sensing vibrations of the wind turbine tower,
a nacelle mounted to the wind turbine tower via a yaw bearing,
a nacelle orientation sensor,
a control system for controlling yawing of the nacelle relative to the wind turbine tower, and wherein the method comprises:
sensing a vibration of the wind turbine tower and a direction of the vibration using the sensor arrangement,
sensing a yaw angle orientation of the nacelle,
determining a difference between the yaw angle orientation and the direction of the sensed vibration,
providing an input including the difference between the yaw angle orientation of the nacelle and the direction of the sensed vibration for the control system in response to the vibration of the wind turbine tower as sensed by the sensor arrangement,
providing an output by the control system based on the input, and
yawing the wind turbine nacelle based on the output from the control system, and hereby reducing wind induced vibrations of the wind turbine tower, wherein yawing the wind turbine nacelle based on the output from the control system includes, if the difference between the yaw angle orientation of the nacelle and the direction of the vibration is between 45 and 90 degrees, yawing the wind turbine nacelle in increments of between 5 and 10 degrees in a direction that decreases the difference between the yaw angle orientation of the nacelle and the direction of the vibration until the vibration stops or the difference between the yaw angle orientation of the nacelle and the direction of the vibration is 0 degrees.

19. A controller including a computer program for controlling the operation of a wind turbine, wherein the computer program, when executed by a data processor of the controller, is adapted to cause the controller to carry out the method as set forth in claim 18.

* * * * *